United States Patent
Rensing et al.

(10) Patent No.: US 11,209,299 B2
(45) Date of Patent: Dec. 28, 2021

(54) NOTCH FILTER IN A VIBRATORY FLOW METER

(71) Applicant: Micro Motion, Inc., Boulder, CO (US)

(72) Inventors: Matthew Joseph Rensing, Cincinnati, OH (US); Timothy J. Cunningham, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 155 days.

(21) Appl. No.: 16/618,549

(22) PCT Filed: Jun. 14, 2017

(86) PCT No.: PCT/US2017/037518
§ 371 (c)(1),
(2) Date: Dec. 2, 2019

(87) PCT Pub. No.: WO2018/231227
PCT Pub. Date: Dec. 20, 2018

(65) Prior Publication Data
US 2020/0149942 A1 May 14, 2020

(51) Int. Cl.
*G01F 1/84* (2006.01)

(52) U.S. Cl.
CPC .......... *G01F 1/8431* (2013.01); *G01F 1/8436* (2013.01); *G01F 1/8477* (2013.01)

(58) Field of Classification Search
None
See application file for complete search history.

(56) References Cited

U.S. PATENT DOCUMENTS

| 3,370,247 A | 2/1968 | Hoffman et al. |
| 2004/0174208 A1* | 9/2004 | Yokoyama ............. H03H 11/04 327/556 |
| 2010/0198531 A1* | 8/2010 | Bell ......................... G01F 1/74 702/45 |

(Continued)

FOREIGN PATENT DOCUMENTS

| CA | 864703 A | * | 2/1971 |
| WO | 9703339 A |   | 1/1997 |

OTHER PUBLICATIONS

Takahiko Mori, "Study on Crane Tele-operation System Using Zero Phase Notch Filter and Model Predictive Control", Proceedings of SICE, Japan, public interest corporation of the Society of Instrument and Control Engineers, 2013, vol. 49, No. 1, p. 2-10.

(Continued)

*Primary Examiner* — Harshad R Patel
(74) *Attorney, Agent, or Firm* — The Ollila Law Group LLC

(57) ABSTRACT

A meter electronics (20) having a notch filter (26) configured to filter a sensor signal from a sensor assembly (10) in a vibratory meter (5) is provided. The meter electronics (20) includes the notch filter (26) communicatively coupled to the sensor assembly (10). The meter electronics (20) is configured to receive the sensor signal from the sensor assembly (10), the sensor signal being comprised of a first component at a resonant frequency of the sensor assembly (10) and a second component at a non-resonant frequency and pass the first component and substantially attenuate the second component with the notch filter, wherein the first component is passed with substantially zero phase shift.

12 Claims, 10 Drawing Sheets

(56) References Cited

U.S. PATENT DOCUMENTS

| | | | |
|---|---|---|---|
| 2011/0178738 A1 | 7/2011 | Rensing et al. | |
| 2011/0264385 A1* | 10/2011 | Weinstein | G01N 9/002 702/48 |
| 2015/0351655 A1* | 12/2015 | Coleman | G16H 50/20 600/301 |
| 2020/0109980 A1* | 4/2020 | Rensing | G01R 23/20 |

OTHER PUBLICATIONS

Matthew Rensing et al: "Coriolis Flowmeter Verification via Embedded Modal Analysis" In: "MEMS and Nanotechnology, vol. 4", Jan. 1, 2011, Springer New York, New York, NY, XP055132407, ISSN: 2191-5644; ISBN: 978-1-46-140210-7, pp. 851-860, DOI: 10.1007/978-1-4419-9834-7_75.

* cited by examiner

NOTCH FILTER IN A VIBRATORY FLOW METER

TECHNICAL FIELD

The embodiments described below relate to vibratory flow meters and, more particularly, to a notch filter in a vibratory flow meter.

BACKGROUND

Vibratory meters, such as for example, Coriolis flow meters, liquid density meters, gas density meters, liquid viscosity meters, gas/liquid specific gravity meters, gas/liquid relative density meters, and gas molecular weight meters, are generally known and are used for measuring characteristics of fluids. Generally, the vibratory meters comprise a sensor assembly and a meter electronics. The material within the sensor assembly may be flowing or stationary. Each type of sensor assembly may have unique characteristics, which a meter must account for in order to achieve optimum performance. For example, some sensor assemblies may require a tube apparatus to vibrate at particular displacement levels. Other sensor assembly types may require special compensation algorithms.

The meter electronics, among performing other functions, typically include stored sensor calibration values for the particular sensor assembly being used. For example the meter electronics may include a reference sensor time period (i.e. the inverse of the reference resonant frequency). The reference sensor time period represents a fundamental measurement performance of the sensor geometry for a specific sensor assembly, as measured in the factory under reference conditions. A change between a sensor time period measured after a vibratory meter is installed at a customer site and a reference sensor time period may represent physical change in the sensor assembly due to coating, erosion, corrosion, or damage to conduits in the sensor assembly, in addition to other causes. A meter verification or health check test can detect these changes.

The meter verification test is typically performed using a multi-component drive signal, which may also be referred to as a multi-tone drive signal, that is applied to the sensor assembly. A multi-tone drive signal is typically comprised of a resonant component, or drive tone, that is at the resonant frequency of a sensor assembly and a plurality of non-resonant components, or test tones, that have frequencies spaced apart from the drive tone frequency. This is distinct from an approach where multiple test tones are cycled sequentially. Any time-variance in the system (e.g. temperature-dependent effects, changes in flow) could corrupt a characterization of the frequency response of the sensor assembly if the sequential tone approach is used. The multi-tone drive signal is advantageous because the sampled data is obtained simultaneously.

To ensure that the signal processing loop for flow and density measurements and the feedback loop used to provide the drive tone do not include the components associated with the test tones, the non-resonant components, they are filtered out. Notch filters are typically used to filter out the non-resonant components before the feedback loop. However, the notch filters may induce a delay or phase shift in the resonant component at the passband portion of the notch filters. This phase delay or shift can cause the frequency of the drive tone to drift away from the resonant frequency of the sensor assembly. Accordingly, there is a need for a notch filter with a passband that does not induce a delay or phase shift in the resonant component while also preventing the components associated with the test tones from reaching the feedback loop.

SUMMARY

A meter electronics having a notch filter configured to filter a sensor signal from a sensor assembly in a vibratory meter is provided. According to an embodiment, the meter electronics comprises a notch filter communicatively coupled to the sensor assembly. The notch filter is configured to receive a sensor signal from the sensor assembly, the sensor signal being comprised of a first component at a resonant frequency of the sensor assembly and a second component at a non-resonant frequency and pass the first component and substantially attenuate the second component with the notch filter, wherein the first component is passed with substantially zero phase shift.

A method of filtering with a notch filter a sensor signal in a vibratory meter is provided. According to an embodiment, the method comprises receiving with a notch filter a sensor signal comprising a first component at a resonant frequency of a sensor assembly and a second component at a non-resonant frequency and passing the first component and substantially attenuating the second component with the notch filter, wherein the first component is passed with a substantially zero phase shift.

A method of configuring a notch filter in a vibratory meter is provided. According to an embodiment, the method comprises providing a notch filter configured to receive a sensor signal comprising a first component at a resonant frequency of the sensor assembly and a second component at a non-resonant frequency and adjusting the notch filter to pass the first component and substantially attenuate the second component, wherein a phase shift of the first component is substantially minimized.

ASPECTS

According to an aspect, a meter electronics (20) having a notch filter (26) configured to filter a sensor signal from a sensor assembly (10) in a vibratory meter (5) comprises the notch filter (26) communicatively coupled to the sensor assembly (10). The notch filter (26) is configured to receive the sensor signal from the sensor assembly (10), the sensor signal being comprised of a first component at a resonant frequency of the sensor assembly (10) and a second component at a non-resonant frequency and pass the first component and substantially attenuate the second component with the notch filter, wherein the first component is passed with substantially zero phase shift.

Preferably, the notch filter (26) configured to pass the first component with the substantially zero phase shift is a fixed-point precision filter.

Preferably, the sensor signal is further comprised of at least one additional non-resonant component and the notch filter (26) is further configured to substantially attenuate the at least one additional non-resonant component.

Preferably, the meter electronics (20) further comprises a drive circuit (22) communicatively coupled to the notch filter (26) and configured to generate a multi-tone drive signal for the sensor assembly (10) based on the first component passed by the notch filter (26).

According to an aspect, a method of filtering with a notch filter a sensor signal in a vibratory meter comprises receiving with the notch filter the sensor signal comprising a first component at a resonant frequency of a sensor assembly and a second component at a non-resonant frequency and passing the first component and substantially attenuating the second component with the notch filter, wherein the first component is passed with a substantially zero phase shift.

Preferably, the method further comprises passing the first component with the substantially zero phase shift with the notch filter that is a fixed-point precision filter.

Preferably, the sensor signal is further comprised of at least one additional non-resonant component and further comprising substantially attenuating the at least one additional non-resonant component with the notch filter.

Preferably, the method further comprises generating a multi-tone drive signal for the sensor assembly based on the first component passed by the notch filter.

According to an aspect, a method of configuring a notch filter in a vibratory meter comprises providing the notch filter configured to receive a sensor signal comprising a first component at a resonant frequency of a sensor assembly and a second component at a non-resonant frequency and adjusting the notch filter to pass the first component and substantially attenuate the second component, wherein a phase shift of the first component is substantially minimized.

Preferably, adjusting the notch filter wherein the phase shift of the first component is substantially minimized comprises adjusting the notch filter wherein the phase shift of the first component is substantially minimized over a frequency range including the resonant frequency.

Preferably, adjusting the notch filter wherein the phase shift of the first component is substantially minimized comprises adjusting the notch filter wherein the phase shift of the first component is substantially minimized at the resonant frequency.

Preferably, the method further comprises minimizing an error of a fixed-point precision implementation of the notch filter by comparing a first phase shift associated with the notch filter having a first fixed-point precision and a second phase shift associated with the notch filter having a second fixed-point precision.

Preferably, the method further comprises implementing a form of the notch filter to substantially minimize an error in a fixed-point precision implementation of the notch filter.

BRIEF DESCRIPTION OF THE DRAWINGS

The same reference number represents the same element on all drawings. It should be understood that the drawings are not necessarily to scale.

DETAILED DESCRIPTION

FIGS. 1-10 and the following description depict specific examples to teach those skilled in the art how to make and use the best mode of embodiments of a notch filter in the vibratory meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the notch filter in the vibratory meter. As a result, the embodiments described below are not limited to the specific examples described below, but only by the claims and their equivalents.

The notch filter can provide a resonant component to a drive signal generator by filtering out a non-resonant component while allowing the resonant component to pass. To ensure that there is zero phase shift of the resonant component, the notch filter can be configured to substantially minimize the phase shift of the resonant component. The phase shift may be substantially minimized at or about the resonant frequency and over a range of frequencies that account for a wide range of resonant frequencies. The phase shift may also be substantially minimized by selecting, for example, a fixed-point precision value that also reduces a computation load on a meter electronics. Accordingly, by not having to adjust for a phase shift of the resonant component, a drive algorithm or circuit may be simplified.

Figure 1:
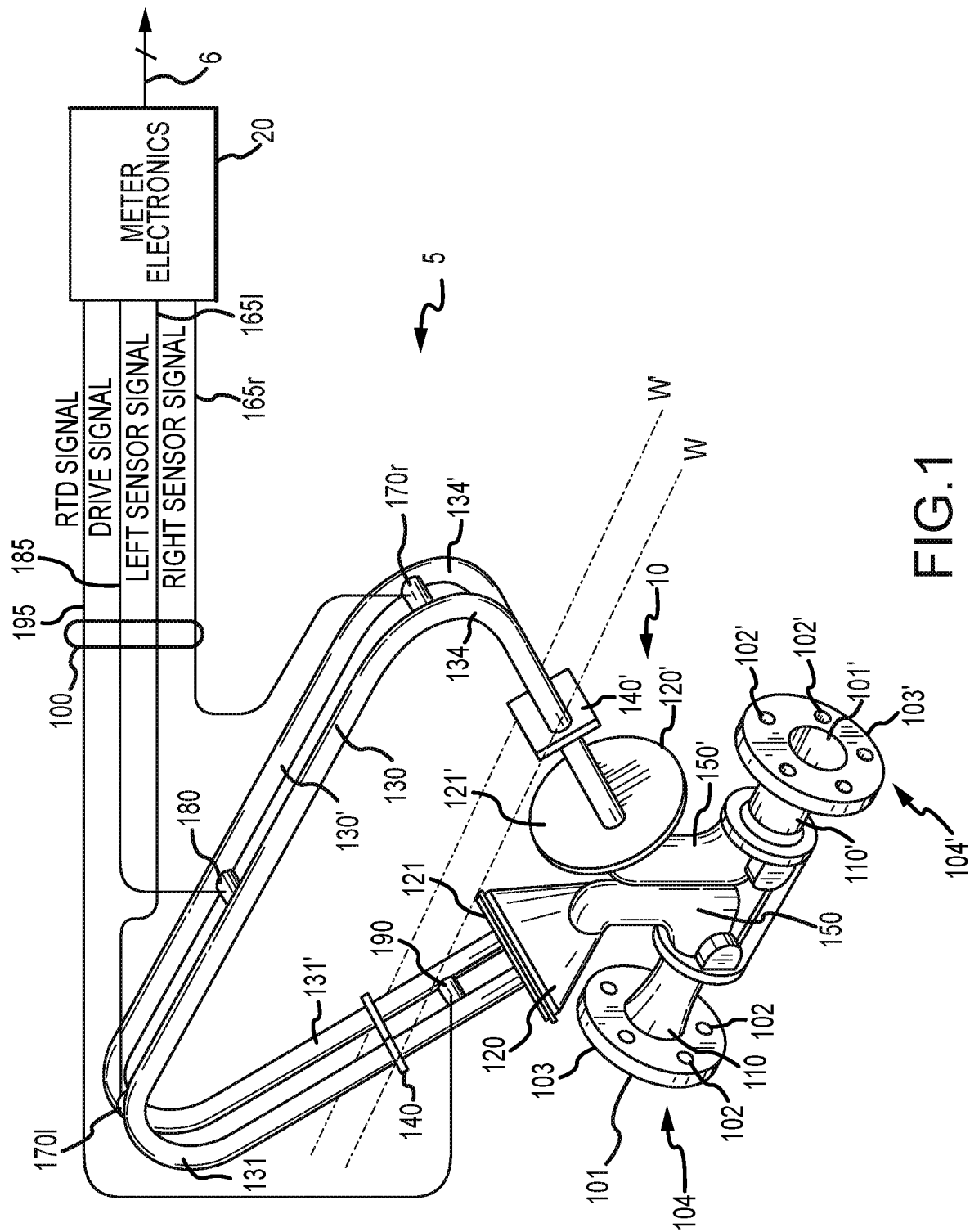
FIG. 1 shows a vibratory meter 5 with notch filters.

FIG. 1 shows a vibratory meter 5 with notch filters. As shown in FIG. 1, the vibratory meter 5 comprises a sensor assembly 10 and meter electronics 20. The sensor assembly 10 responds to mass flow rate and density of a process material. The meter electronics 20 is connected to the sensor assembly 10 via leads 100 to provide density, mass flow rate, and temperature information over path 6, as well as other information.

The sensor assembly 10 includes a pair of manifolds 150 and 150', flanges 103 and 103' having flange necks 110 and 110', a pair of parallel conduits 130 and 130', drive mechanism 180, resistive temperature detector (RTD) 190, and a pair of pick-off sensors 170*l* and 170*r*. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through sensor assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by lead 195.

Both of the conduits 130, 130' are driven by drive mechanism 180 in opposite directions about their respective bending axes W and W' and at what is termed the first out-of-phase bending mode of the flow meter. This drive mechanism 180 may comprise any one of many well-known arrangements, such as a magnet mounted to the conduit 130' and an opposing coil mounted to the conduit 130 and through which an alternating current is passed for vibrating both conduits 130, 130'. A suitable drive signal is applied by the meter electronics 20, via lead 185, to the drive mechanism 180.

The meter electronics 20 receives the RTD temperature signal on lead 195, and the left and right sensor signals appearing on leads 100 carrying the left and right sensor signals 165l, 165r, respectively. The meter electronics 20 produces the drive signal appearing on lead 185 to drive mechanism 180 and vibrate conduits 130, 130'. The meter electronics 20 processes the left and right sensor signals and the RTD signal to compute the mass flow rate and the density of the material passing through sensor assembly 10. This information, along with other information, is applied by meter electronics 20 over path 6 as a signal.

Figure 2:
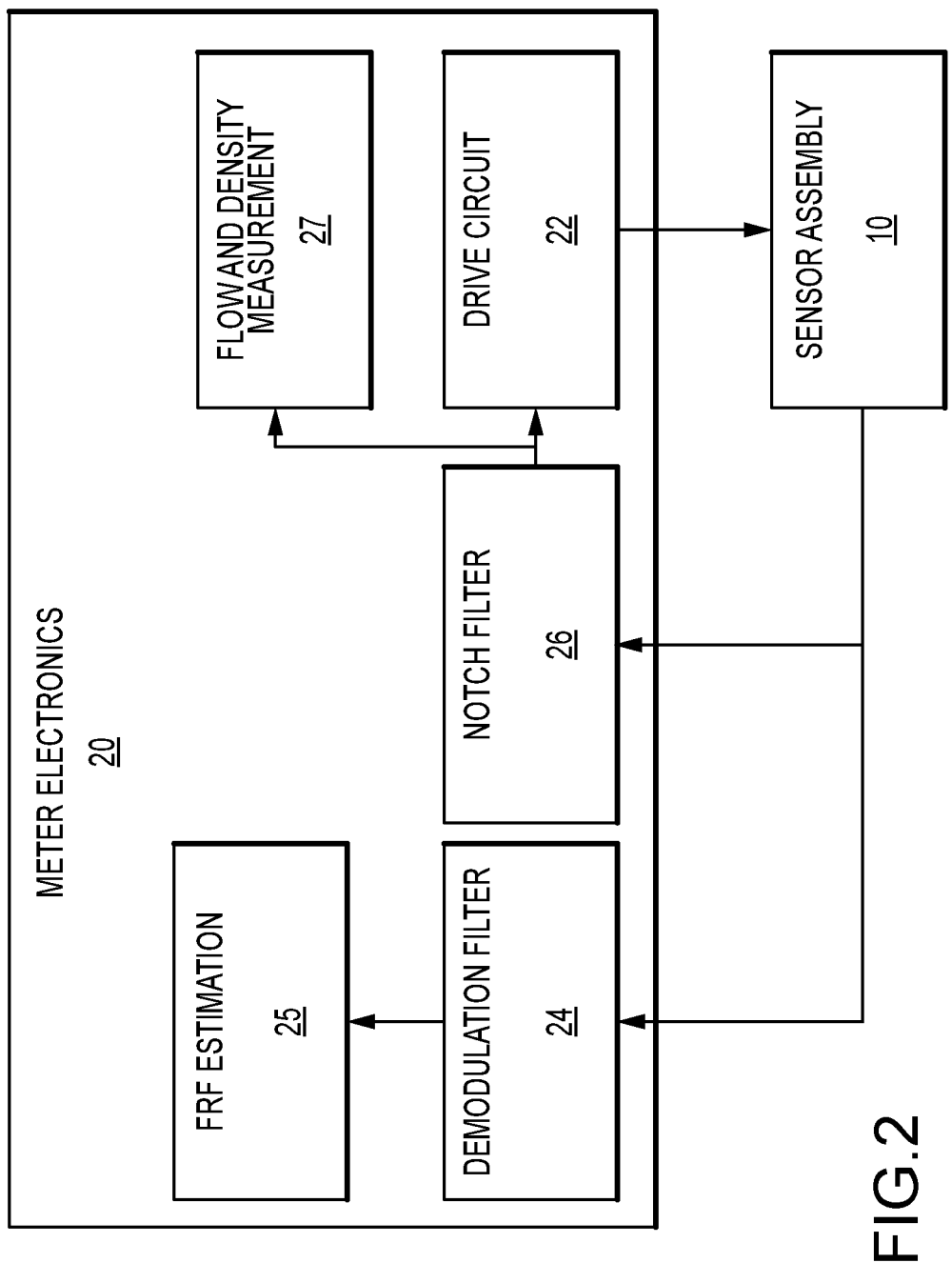
FIG. 2 shows a block diagram of the vibratory meter 5 with notch filters according to an embodiment.

FIG. 2 shows a block diagram of the vibratory meter 5 with notch filters according to an embodiment. As shown in FIG. 2, the vibratory meter 5 includes the sensor assembly 10 and the meter electronics 20 communicatively coupled to the sensor assembly 10. The meter electronics 20 is configured to provide a multi-tone drive signal to the sensor assembly 10. The sensor assembly 10 provides sensor signals to the meter electronics 20. The meter electronics 20 includes a drive circuit 22 and a demodulation filter 24 that are communicatively coupled to the sensor assembly 10. The demodulation filter 24 is communicatively coupled to an FRF estimation unit 25. A notch filter 26 is communicatively coupled to the drive circuit 22 and a flow and density measurement module 27. The notched filtered signal is provided to the flow and density measurement module 27 to determine the flow rate and/or density of the fluid in the vibratory meter 5.

The drive circuit 22 receives a resonant component of the sensor signal from the notch filter 26. The drive circuit 22 is configured to generate a multi-tone drive signal for the sensor assembly 10. The multi-tone drive signal is comprised of a drive tone and test tones. The drive tone is based on the resonant component provided by the notch filter 26. For example, the drive circuit 22 may include a feedback circuit that receives the resonant component and generates the drive tone by amplifying the resonant component. Other methods may be employed. The drive circuit 22 can also generate the test tones at predetermined frequencies that are spaced apart from the resonant frequency.

The demodulation filter 24 receives the sensor signal from the sensor assembly 10 and filters out intermodulation distortion signals that may be present in the sensor signal. For example, the drive tone and test tones in the multi-tone drive signal may induce intermodulation distortion signals in the sensor signals provided by the sensor assembly 10. To filter out the intermodulation distortion signals, the demodulation filter 24 may include demodulation windows or passbands that include the frequencies of the drive tone and the test tones. Accordingly, the demodulation filter 24 provides a sensor signal comprised of the resonant components and components that correspond to the test tones, while preventing the intermodulation distortion signals from corrupting meter verification of the sensor assembly 10. The meter verification is performed using the FRF estimation unit 25, which compares the components corresponding to the test tones and the test tones to characterize the frequency response of the sensor assembly.

The notch filter 26 is used during meter verification. Accordingly, the notch filter 26 may not be switched in during normal flow and density measurement. Due to fairly large frequency changes in normal operation, coefficients of the notch filter 26 coefficients would need to be frequently calculated and updated, which results in additional computational load and possible unwanted transients. Instead, when meter verification is utilized, the drive tone is sampled to determine the carrier frequency and the coefficients of the notch filter 26 are calculated based on the determined carrier frequency. The notch filter 26 is then switched in and the test tones are ramped to desired amplitude. During meter verification, the carrier frequency may be monitored and if a difference between the determined carrier frequency (determined during the sampling of the drive tone as described above) and the carrier frequency during meter verification is greater than a threshold, then the meter verification may be terminated by, for example, switching out the notch filter 26 and turning off the test tones.

To filter out the sensor signal components, the notch filter 26 includes a plurality of stop bands centered at or about the frequencies of the test tones. The sensor signal components are attenuated or filtered out due to being centered at or about the frequencies of the stop bands. The resonant signal is passed due to being in the pass band of the notch filter 26. However, the resonant signal may have a phase shift due to the notch filters. This phase shift can increase the overall phase delay of the drive feedback, which can increase the overall complexity of a drive algorithm or circuit that generates the drive tone while also having to compensate for a phase shift when the notch filter 26 is switched in for the meter verification.

Figure 3:
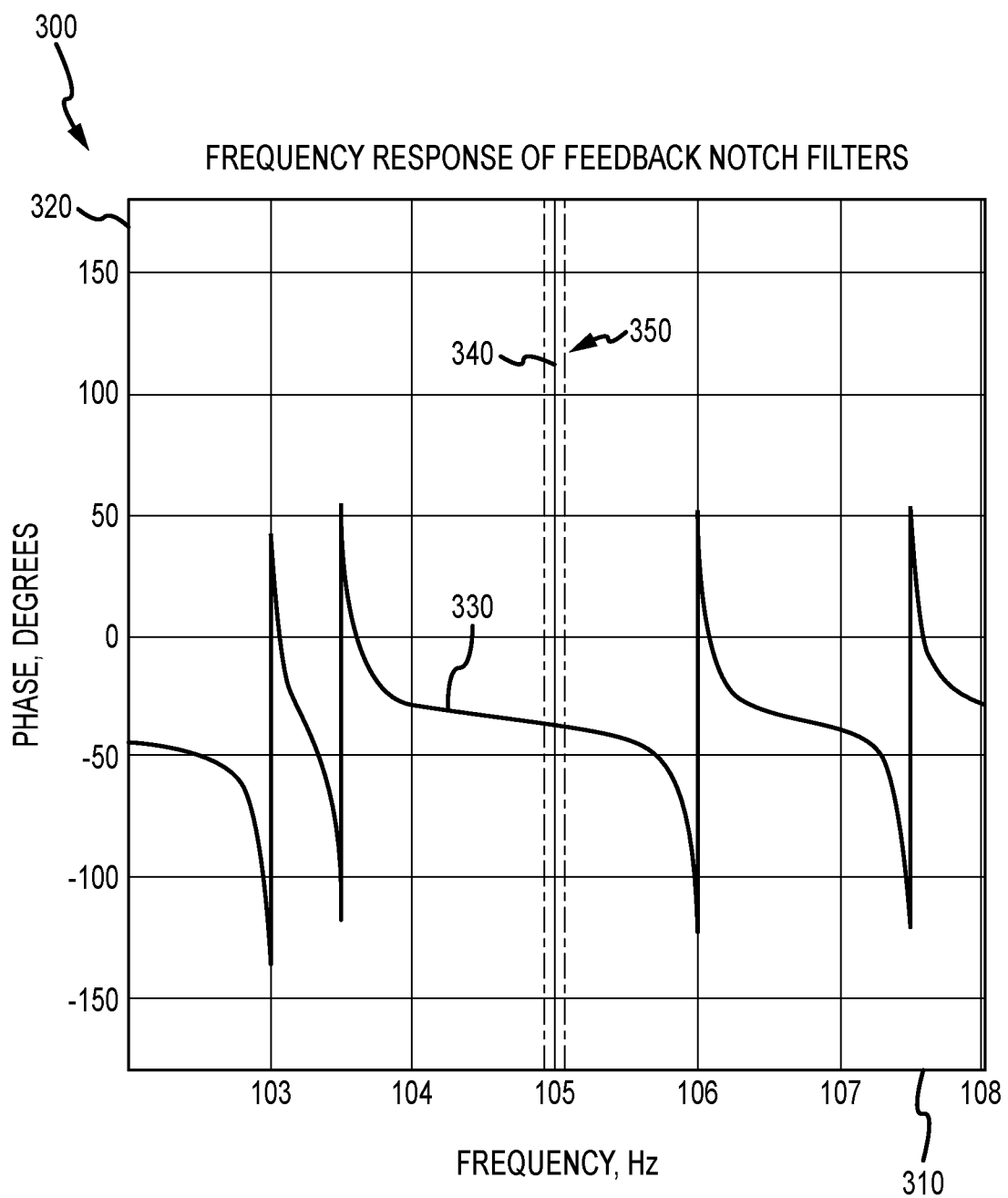
FIGS. 3 and 4 show graphs 300, 400 illustrating a phase response of notch filters in vibratory meters with a substantial phase shift.
Figure 4:
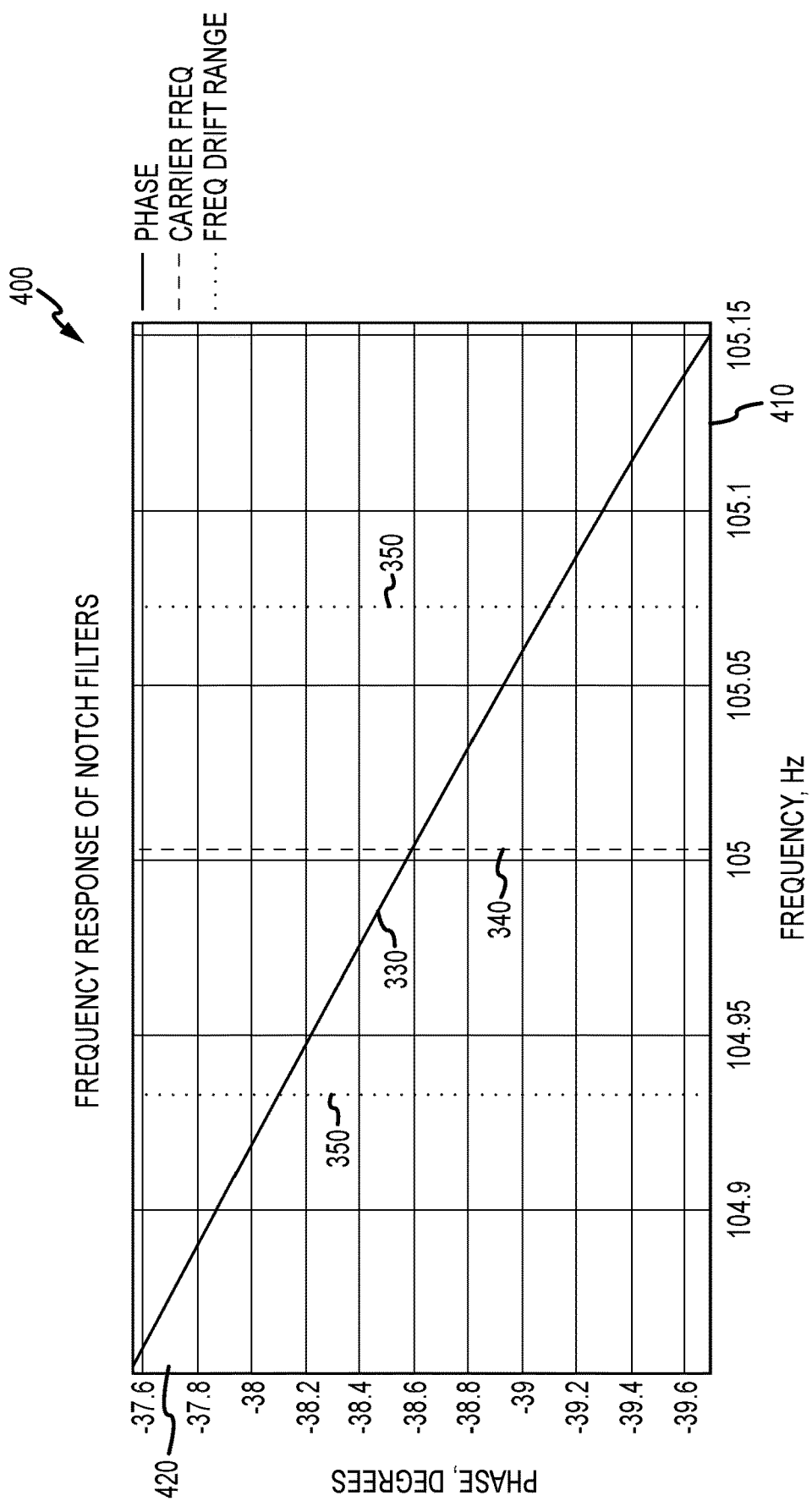

FIGS. 3 and 4 show graphs 300, 400 illustrating a phase response of notch filters in vibratory meters with a substantial phase shift. As shown in FIGS. 3 and 4, the graphs 300, 400 include a frequency axis 310, 410 and phase shift axis 320, 420. In FIG. 3, the frequency axis 310 ranges from 102 to 108 hertz (Hz) and the phase shift axis 320 ranges from −180 to 180 degrees. In FIG. 4, the frequency axis 410 ranges from 104.85 to 105.15 Hz and the phase shift axis ranges from about −39.7 to about −37.6 degrees. The graphs 300, 400 also include a phase plot 330. More specifically, FIG. 4 shows an enlarged view of the phase plot 330 shown in FIG. 3. The graphs 300, 400 also include a carrier frequency line 340 and frequency drift lines 350.

As can be seen in FIG. 4, the phase plot 330 appears as a straight line from about −37.6 degrees to about −39.7 degrees over the frequency range of about 104.85 to 105.15 Hz. At the carrier frequency, which is illustrated by the carrier frequency line 340, of about 105.1 Hz, the phase plot 330 is at about −38.6 degrees. As a result, the resonant signal passed by the notch filter will have a phase shift of about 38.6 degrees. The drive algorithm or circuit would need to account for the phase shift or delay to ensure that the overall phase delay of the drive algorithm or circuit is at a desired value, such as, for example, substantially zero.

Figure 5:
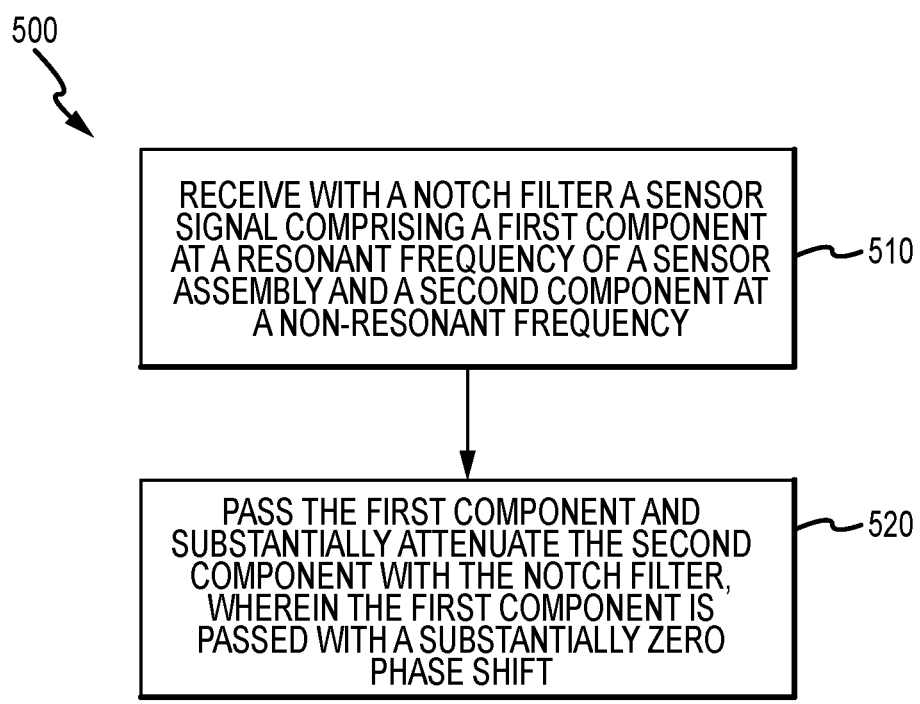
FIG. 5 shows a method 500 of filtering with a notch filter a sensor signal from a sensor assembly in a vibratory meter.

FIG. 5 shows a method 500 of filtering with a notch filter a sensor signal from a sensor assembly in a vibratory meter. As shown in FIG. 5, the method 500, in step 510, receives with a notch filter a sensor signal comprising a first component at a resonant frequency of a sensor assembly and a second component at a non-resonant frequency. In step 520, the method passes the first component and substantially attenuates the second component with the notch filter, wherein the first component is passed with substantially zero phase shift.

The first component may be a resonant signal that corresponds to a drive tone in a multi-component drive signal provided to the sensor assembly. The first component may be at the resonant frequency of the sensor assembly. The notch filter may have a pass band with a phase shift that is centered at the resonant frequency, as will be discussed in more detail in the following with reference to FIGS. 7 and 8.

The second component may be a non-resonant component that corresponds to, for example, one of the test tones in the multi-tone drive signal provided to the sensor assembly 10. It is desired that there is no second component after the notch filter 26 for the drive circuit 22 and for the flow and density measurement module 27. For the FRF estimation unit 25, both the first and second components may be needed. For example, the unfiltered sensor signal may be used to fit a curve, such as a pole zero, or the like, that describes the frequency response of the sensor assembly 10.

The notch filter configured to pass the first component can include pass band having a range of frequencies about the first component. For example, the resonant frequency of the sensor assembly may vary within a range of frequencies, causing the first component to vary for various reasons, such as temperature changes, or the like. As a result, the frequency of the first component can vary within the passband of the notch filter. Nevertheless, the notch filter may be configured to ensure that the phase shift of the first component is still substantially zero when the frequency of the first component varies within the passband. A method that configures the notch filter is described in the following.

Figure 6:
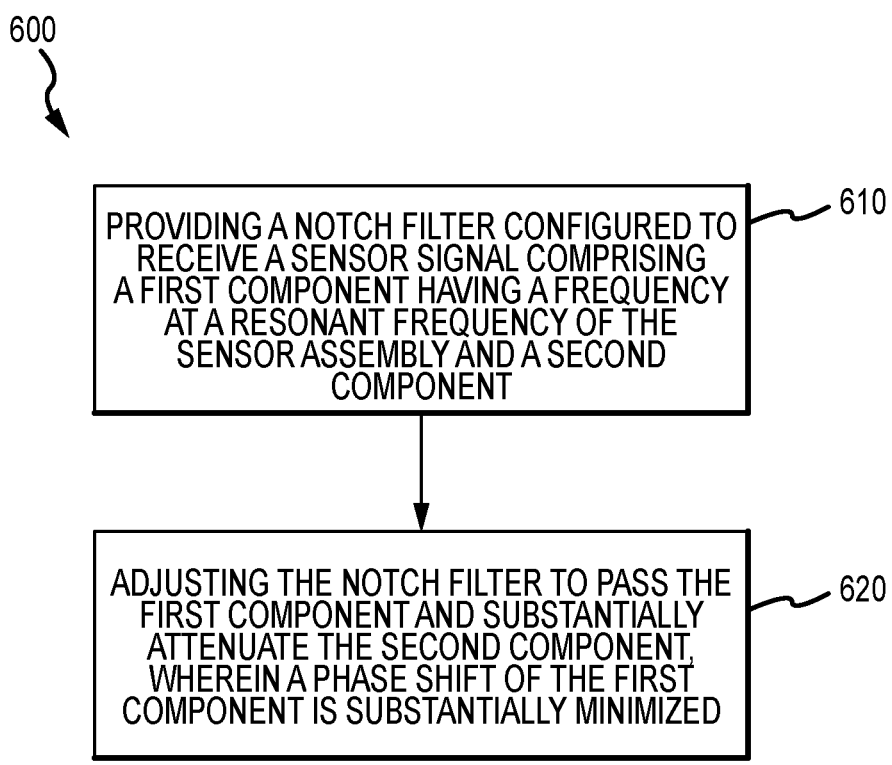
FIG. 6 shows a method 600 of configuring a notch filter to filter a sensor signal from a sensor assembly in a vibratory meter.

FIG. 6 shows a method 600 of configuring a notch filter to filter a sensor signal from a sensor assembly in a vibratory meter. As shown in FIG. 6, the method 600, in step 610, provides a notch filter configured to receive a sensor signal comprising a first component having a frequency at a resonant frequency of the sensor assembly and a second component. In step 620, the method 600 adjusts the notch filter to pass the first component and substantially attenuate the second component, wherein a phase shift of the first component is substantially minimized.

As with method 500, the first component received in method 600 may be at the resonant frequency of the sensor assembly 10 and the second component may be at the non-resonant frequency. In step 620, the method 600 can adjust the notch filter such that the first component is passed by centering the passband of the notch filter at the resonant frequency of the sensor assembly. The resonant frequency relied on to center the pass band may be determined, for example, during design, calibration, during operation, or the like, of the sensor assembly.

Adjusting the notch filter may include adjusting coefficients in a digital filter, such as a finite impulse response filter (FIR) or an infinite impulse response filter (IIR). Exemplary filters are discussed in more detail in the following with reference to FIG. 10. Adjusting the notch filter may also include adjusting other elements within the notch filter, such as phase-shift elements that can compensate for a phase shift caused by the notch filter design. For example, it may be desirable to introduce a delay in a filter to increase the computation speed of the filter, but then compensate for the delay with the phase-shift elements.

The phase shift of the first component may be minimized by, for example, centering the passband of a notch filter designed to cause zero phase shift at the resonant frequency. The phase shift may also be minimized by minimizing the phase shift of the passband over a range of frequencies. For example, as discussed above with reference to method 500, the phase shift of the pass band may vary within the frequency range of the first component.

As a result, the first component can be passed by the notch filter with a substantially zero phase shift while also allowing for some changes in the resonant frequency of the sensor assembly. Exemplary notch filters and their phase responses are discussed in more detail in the following with reference to FIGS. 7 and 8.

Figure 7:
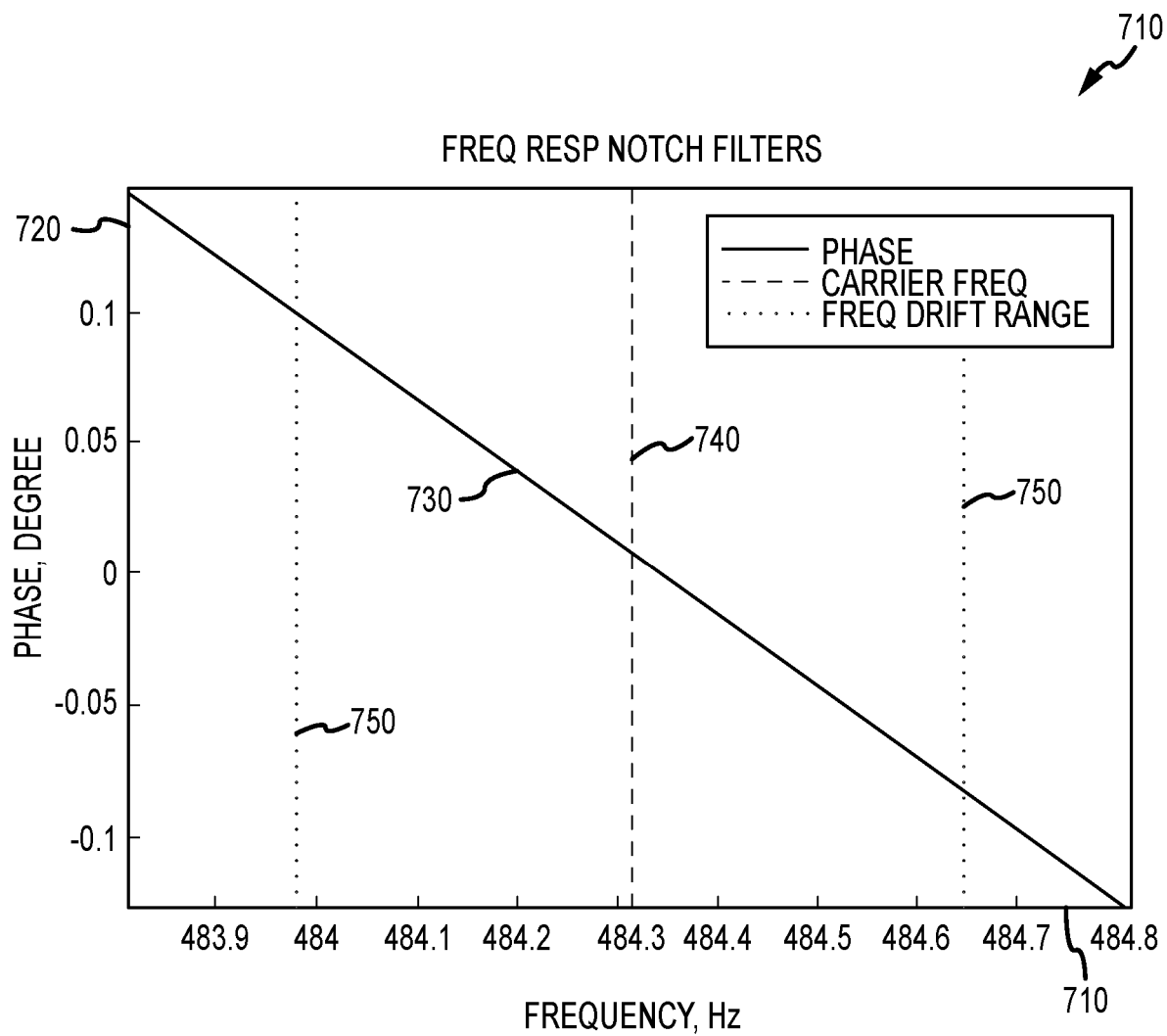
FIGS. 7 and 8 show graphs 700, 800 illustrating phase responses of notch filters according to an embodiment.
Figure 8:
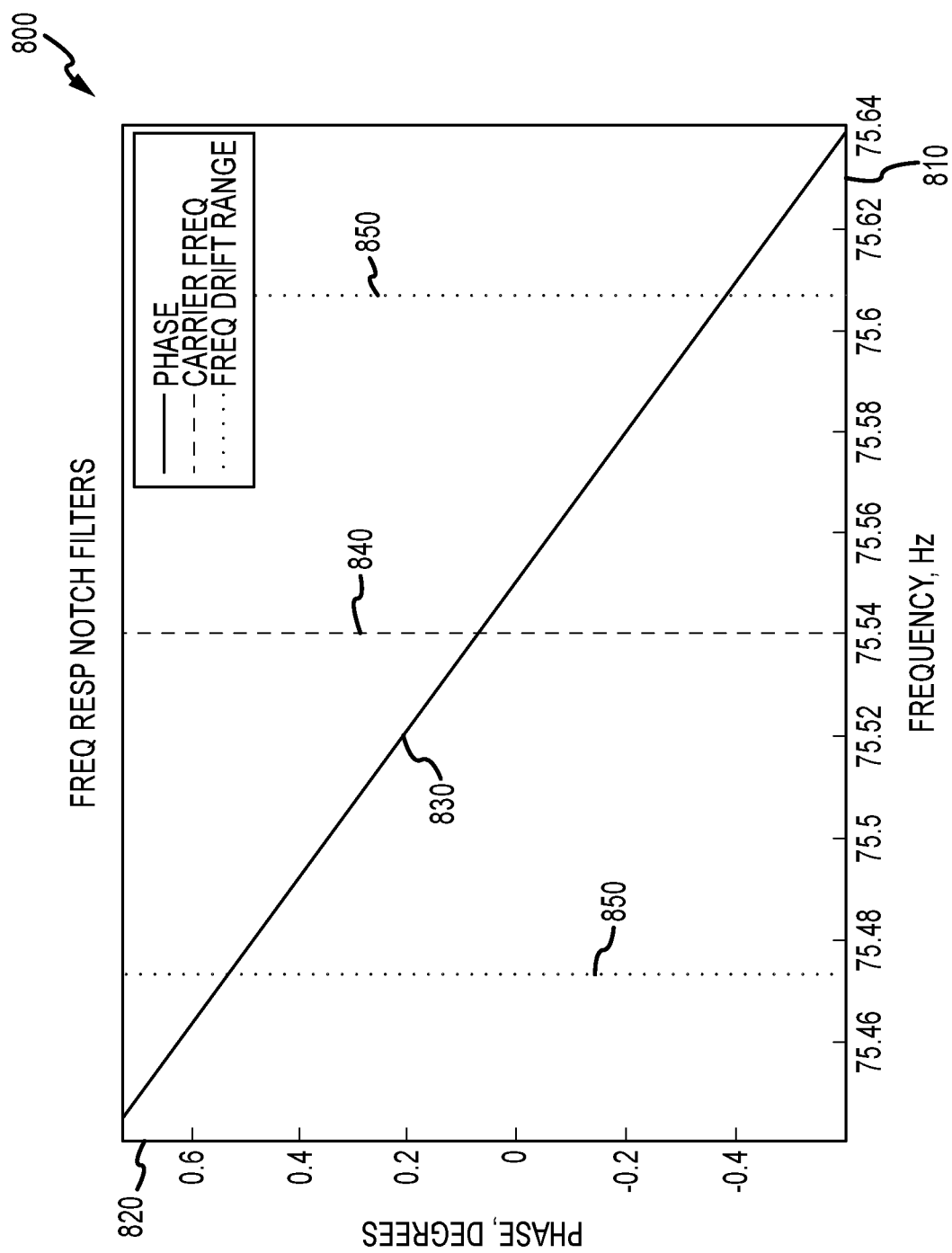

FIGS. 7 and 8 show graphs 700, 800 illustrating phase responses of notch filters according to an embodiment. As shown in FIGS. 7 and 8, the graphs 700, 800 include a frequency axis 710, 810 and a phase shift axis 720, 820. The graph 700 in FIG. 7 is related to a relatively high frequency vibratory meter and the graph 800 shown in FIG. 8 is related to a relatively low frequency vibratory meter. In FIG. 7, the frequency axis 710 ranges from about 483.8 Hz to about 484.8 Hz and the phase shift axis 720 ranges from about −0.125 to about 0.15 degrees. In FIG. 8, the frequency axis 810 ranges from about 75.44 to about 75.64 Hz and the phase shift axis 820 ranges from about −0.5 to about 0.65 degrees. Also shown in FIGS. 7 and 8 are phase response plots 730, 830 and carrier frequency lines 740, 840. On either side of the carrier frequency lines 740, 840 are frequency drift lines 750, 850.

As can be seen, the phase response plots 730, 830 are substantially centered at the resonant frequency of the sensor assembly. The portion of the phase response plots 730, 830 that are shown are within the passband of the notch filter. Accordingly, the pass band of the notch filter is centered at the resonant frequency of the sensor assembly 10. As a result, resonant component (e.g., the first component discussed above with reference to methods 500, 600) may be passed by the notch filter with a substantially zero phase shift.

In addition, the frequency of the resonant component can vary within a range, such as within the range defined by the frequency drift lines 750, 850, while still being passed by the notch filter with substantially zero phase shift. For example, with reference to FIG. 7, at about 484 Hz, the phase shift of the notch filter is about 0.1 degrees. At the frequency of about 484.65 Hz, the phase shift of the notch filter is about −0.1 degrees. As a result, the resonant component can change or drift within this range without inducing more than a 0.1 degree phase shift. Similarly, with reference to FIG. 8, the phase shift ranges from about 0.4 degrees at about 75.47 Hz to about −0.3 Hz at about 75.61 Hz. These phase shifts are significantly less than the 38 to 39 degree phase shift described above with reference to FIG. 4. Accordingly, the notch filters characterized by the phase response plots 730, 830 can pass the resonant component with a substantially zero phase shift over the frequency drift range of the resonant component.

As can be appreciated, the notch filters characterized by the phase response plots 730, 830 can be further configured or adjusted according to the methods 500, 600 to further reduce the phase shift to the first component. For example, the notch filters can have multiple stop bands similar to those shown in FIG. 3, which can be adjusted to reduce the phase shift over the passband of the notch filter. More specifically, the phase shift at the pass bands of the notch filters can be reduced to reduce the variation of the phase shift in the pass band of the notch filter. Accordingly, with reference to FIG. 7, the phase shift range within the frequencies defined by the frequency drift lines 750 may be further decreased from the 0.1 to −0.1 degrees.

As can be also appreciated, signal processing used to implement the notch filter may have a precision associated with each discrete value. For example, a given sample of the sensor signal may be a floating point or a fixed point number. It may, however, be desirable to utilize fixed point numbers to ensure suitably efficient signal processing by a processor in, for example, the meter electronics 20. Accordingly, the predetermined fixed point precision may be minimized while also ensuring that, for example, the phase shift at the resonant frequency is substantially zero or substantially minimized, as is described in more detail in the following with reference to FIGS. 9 and 10.

Figure 9:
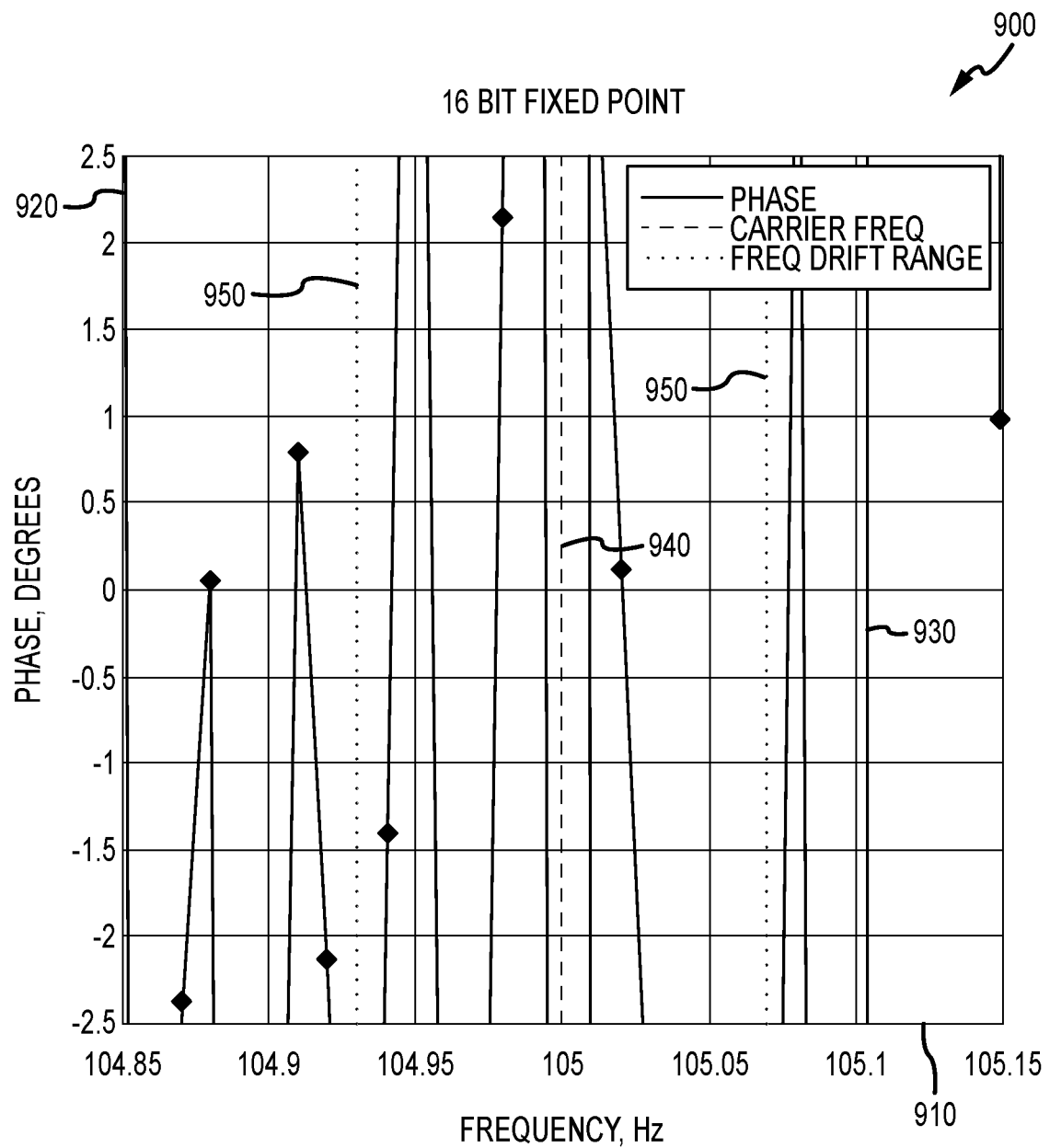
FIGS. 9 and 10 show graphs 900, 1000 illustrating a phase response of notch filters in a vibratory meter according to an embodiment.
Figure 10:
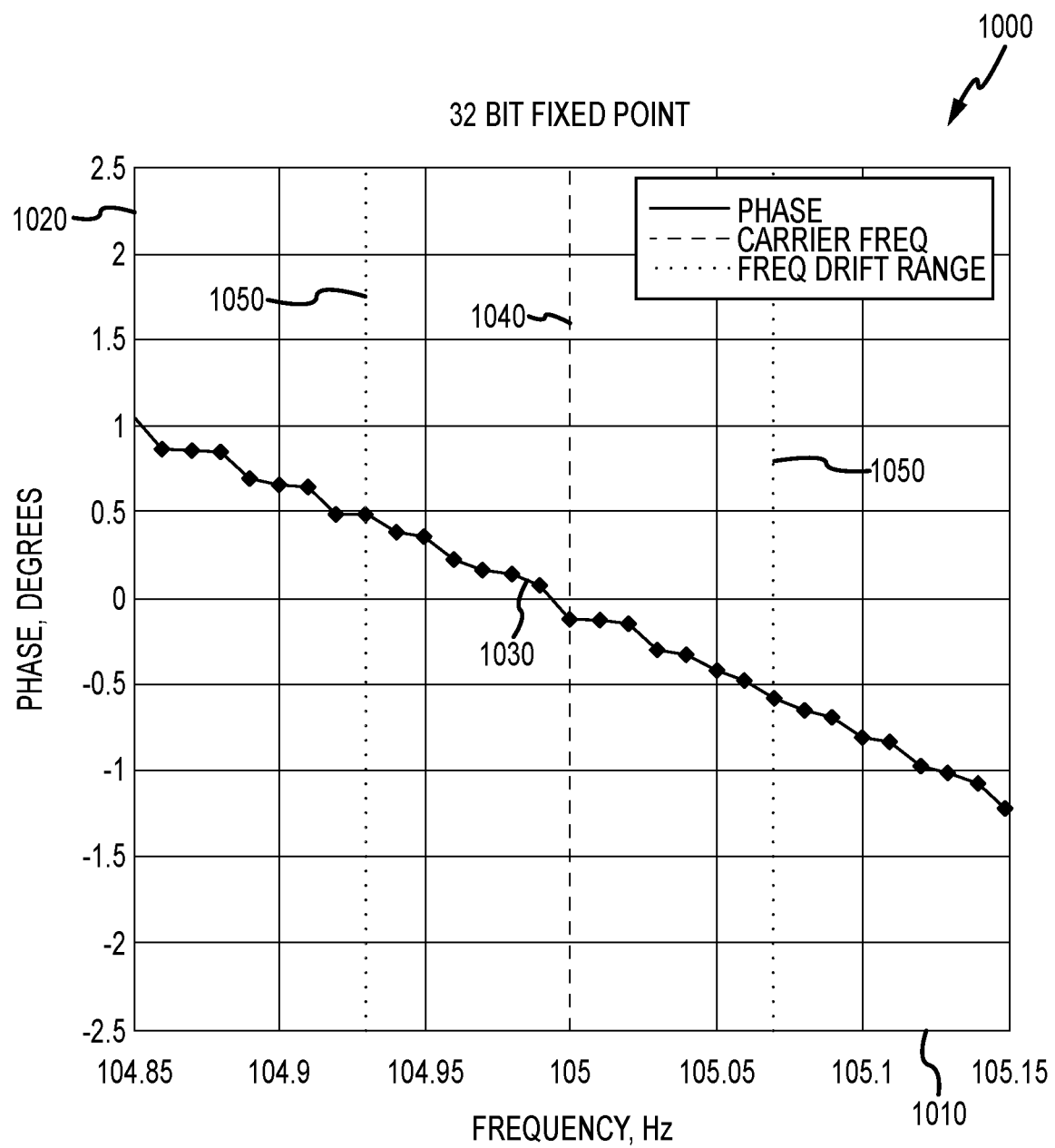

FIGS. 9 and 10 show graphs 900, 1000 illustrating a phase response of notch filters in a vibratory meter according to an embodiment. As shown in FIGS. 9 and 10, the graphs 900, 1000 include a frequency axis 910, 1010 and phase shift axis 920, 1020. In FIGS. 9 and 10, the frequency axis 910 ranges from 104.85 to 106.15 Hz and the phase shift axis ranges from −1.8 to 0.2 degrees. Also shown in the graphs 900, 1000 are phase plots 930, 1030. The graphs 900, 1000 also include a carrier frequency line 940 and frequency drift lines 1050. The carrier frequency line 940 is at about 105 Hz.

As can be appreciated, the phase plots 930, 1030 are not a straight line, in contrast to the phase plot 330 shown in FIG. 4. As can also be appreciated, the phase plot 930 shown in FIG. 9 is substantially more disjointed or discontinuous than the phase plot 1040 shown in FIG. 10. The disjointed appearance of the phase plots 930, 1030 is due to a precision of a notch filter employed to filter the sensor signal, which may cause, for example, coefficient quantization error. More specifically, real number coefficients of, for example, an IIR filter may be quantized to the nearest digitally represented number.

The notch filter characterized in FIG. 9 has 16-bit precision whereas the notch filter characterized in FIG. 10 has 32-bit precision. As can be appreciated, the phase plot 930 shown in FIG. 9 is not substantially zero or minimized at the carrier frequency of 105 Hz. In contrast, the phase plot 1030 shown in FIG. 10 is about −0.1 degrees at the carrier frequency of 105 Hz, which is substantially zero or minimized. Accordingly, the 32-bit precision notch filter is more suitable than the 16-bit precision notch filter.

In addition to the precision of the notch filter, the notch filter design can affect the phase shift of the notch filter. For example, the results shown in FIGS. 9 and 10 are implemented with a second order IIR filter that can be expressed as a z-transfer function H (z) of:

$$H(z) = \frac{Y(z)}{U(z)} = \frac{1 - 2\cos(\omega_0)z^{-1} + z^{-2}}{1 - 2\alpha\cos(\omega_0)z^{-1} + \alpha^2 z^{-2}}, \quad (1)$$

where:
$\omega_0$ is a center frequency of the stop band; and
$\alpha$ is a bandwidth parameter.

This may be an improvement over, for example, a modified form of the second order IIR filter with a delayed output, which can cause the phase shifts shown in FIGS. 3 and 4. For four test tones, including the two shown in FIGS. 3 and 4, the bandwidth coefficient $\alpha$ may be vector of [0.9999 0.99987 0.9999 0.9999]. That is, each value in the vector corresponds to a test tone frequency about which the stop band frequency $\omega_0$ is centered. Accordingly, a notch filter may be constructed as a cascade of four second order IIR filter stages, each of which has a stop band center frequency that is at a test tone frequency and having a corresponding bandwidth parameter $\alpha$ from the above vector.

More specifically, the bandwidth parameter $\alpha$ of each of the notch filters can be adjusted to insure that the phase shift through the cascaded notch filter stages is zero at the center frequency $\omega_0$. Although the above lists four bandwidth parameters $\alpha$ for the cascaded notch filter stages, other values may be employed in other embodiments. The bandwidth parameters $\alpha$ listed above may result in substantially zero phase shift for the first, passed, signal. In these and other embodiments, the bandwidth parameters $\alpha$ are typically adjusted one time, in an offline manner (e.g., during design, calibration, or the like), although the bandwidth parameters $\alpha$ may be adjusted dynamically in real time, such as during the meter verification.

In addition, once the bandwidth parameters $\alpha$ are computed, the phase shift needs to be substantially zero for a wide range of center frequencies. For example, the bandwidth parameters $\alpha$ may be chosen to work over a range of carrier frequencies, i.e. that the phase shift at the center frequency $\omega_0$ is not a function of the center frequency $\omega_0$. This may be enabled by the implementation of these IIR filters, where they are implemented parametrically in terms of the bandwidth parameters $\alpha$ and the center frequency $\omega_0$. The bandwidth parameters $\alpha$ may not change with center frequency $\omega_0$. The filter coefficients, based on the bandwidth parameters $\alpha$ and the center frequency $\omega_0$ (and sample time), may be calculated in real time when the filters are applied. This implementation means that a single set of bandwidth parameters $\alpha$ can be used for a wide range of center frequencies $\omega_0$ and still have minimal phase shift.

Alternative forms may be employed that have a minimized phase shift with lower fixed-point precision. For example, a lattice form of the notch filter described by the following equation may be implemented:

$$\theta_1 = 2\pi \frac{f_{notch}}{f_{sample}} + \frac{\pi}{2} \quad (2)$$

$$\theta_2 = \sin^{-1}(\alpha^2) \quad (3)$$

$$\begin{bmatrix} g_1 \\ w \end{bmatrix} = \begin{bmatrix} \cos\theta_2 & -\sin\theta_2 \\ \sin\theta_2 & \cos\theta_2 \end{bmatrix} \begin{bmatrix} u(n) \\ x_2(n) \end{bmatrix} \quad (4)$$

$$y = \frac{1}{2}(u(n) + w) \quad (5)$$

$$\begin{bmatrix} x_1(n+1) \\ x_2(n+1) \end{bmatrix} = \begin{bmatrix} \cos\theta_1 & -\sin\theta_1 \\ \sin\theta_1 & \cos\theta_1 \end{bmatrix} \begin{bmatrix} g_1 \\ x_1(n) \end{bmatrix} \quad (6)$$

where:
$f_{notch}$ is the center frequency of a stop band in the notch filter;
$f_{sample}$ is a sampling frequency;

α is a bandwidth parameter that is proportional to the bandwidth of the stopband;

$\theta_1$ is a parameter related to the notch frequency $f_{notch}$; and $\theta_2$ is a parameter related to α.

Where the notch filter is implemented with a lattice form, the notch filter may have a precision of 16-bit but still provide an acceptable phase shift at the carrier or drive tone frequency. For example, rather than the large phase shifts shown in FIG. 9 for a 16-bit notch filter implemented in a non-lattice form, a phase shift of 16-bit lattice form of the notch filter may be similar to the phase shift shown in FIG. 10. Accordingly, by using a particular digital filter form, a lower fixed-point precision may achieve the desired substantially minimized or zero phase shift.

The method 600 provides a new and improved notch filter such that a phase shift of a component of a sensor signal, such as a resonant component, is substantially minimized. By substantially minimizing the phase shift, a drive algorithm or a drive circuit can consider the phase delay as being substantially minimized or that the notch filter has a substantially zero phase delay. This can simplify the drive algorithm or circuit, thereby reducing design costs of the meter electronics 20. The new and improved method 500 and vibratory meter 5 employ the notch filter to attenuate or filter out sensor signal components in a sensor signal provided by a sensor assembly 10, thereby preventing the sensor signals from being used to generate the drive signal. This can reduce a computation load of a processor in the meter electronics 20.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other notch filters in vibratory meters and not just to the embodiments described above and shown in the accompanying figures. Accordingly, the scope of the embodiments described above should be determined from the following claims.

We claim:

1. A meter electronics (20) having a notch filter (26) configured to filter a sensor signal from a sensor assembly (10) in a vibratory meter (5), the meter electronics (20) comprising:
   the notch filter (26) communicatively coupled to the sensor assembly (10) and configured to:
      receive the sensor signal from the sensor assembly (10), the sensor signal being comprised of a first component at a resonant frequency of the sensor assembly (10) and a second component at a non-resonant frequency; and
      pass the first component and substantially attenuate the second component with the notch filter, wherein the first component is passed with substantially zero phase shift.

2. The meter electronics (20) of claim 1, wherein the notch filter (26) configured to pass the first component with the substantially zero phase shift is a fixed-point precision filter.

3. The meter electronics (20) of claim 1, wherein the sensor signal is further comprised of at least one additional non-resonant component and the notch filter (26) is further configured to substantially attenuate the at least one additional non-resonant component.

4. The meter electronics (20) of claim 1, further comprising a drive circuit (22) communicatively coupled to the notch filter (26) and configured to generate a multi-tone drive signal for the sensor assembly (10) based on the first component passed by the notch filter (26).

5. A method of filtering with a notch filter a sensor signal in a vibratory meter, the method comprising:
   receiving with the notch filter the sensor signal comprising a first component at a resonant frequency of a sensor assembly and a second component at a non-resonant frequency; and
   passing the first component and substantially attenuating the second component with the notch filter, wherein the first component is passed with a substantially zero phase shift.

6. The method of claim 5, further comprising passing the first component with the substantially zero phase shift with the notch filter that is a fixed-point precision filter.

7. The method of claim 5, wherein the sensor signal is further comprised of at least one additional non-resonant component and further comprising substantially attenuating the at least one additional non-resonant component with the notch filter.

8. The method of claim 5, further comprising generating a multi-tone drive signal for the sensor assembly based on the first component passed by the notch filter.

9. A method of configuring a notch filter in a vibratory meter, the method comprising:
   providing the notch filter configured to receive a sensor signal comprising a first component at a resonant frequency of a sensor assembly and a second component at a non-resonant frequency; and
   adjusting the notch filter to pass the first component and substantially attenuate the second component, wherein a phase shift of the first component is substantially minimized over a frequency range including the resonant frequency.

10. The method of claim 9, wherein adjusting the notch filter such that the phase shift of the first component is substantially minimized comprises adjusting the notch filter such that the phase shift of the first component is substantially minimized at the resonant frequency.

11. The method of claim 9, further comprising minimizing an error of a fixed-point precision implementation of the notch filter by comparing a first phase shift associated with the notch filter having a first fixed-point precision and a second phase shift associated with the notch filter having a second fixed-point precision.

12. The method of claim 9, further comprising implementing a form of the notch filter to substantially minimize an error in a fixed-point precision implementation of the notch filter.

\* \* \* \* \*